(12) United States Patent
García Manchado

(10) Patent No.: US 10,185,532 B2
(45) Date of Patent: Jan. 22, 2019

(54) EXTENDED LED PANEL, MOBILE DEVICE AND METHOD FOR INTERACTION AND COMMUNICATION VIA AN EXTERNAL LED PANEL

(71) Applicant: CRAMBO, S.A., Torrejón de Ardoz (ES)

(72) Inventor: Miguel Ángel García Manchado, Torrejón de Ardoz (ES)

(73) Assignee: CRAMBO, S.A., Torrejón de Ardoz (Madrid) (ES)

( * ) Notice: Subject to any disclaimer, the term of this patent is extended or adjusted under 35 U.S.C. 154(b) by 0 days.

(21) Appl. No.: 15/521,543

(22) PCT Filed: Oct. 26, 2015

(86) PCT No.: PCT/ES2015/070773
§ 371 (c)(1),
(2) Date: Apr. 24, 2017

(87) PCT Pub. No.: WO2016/062912
PCT Pub. Date: Apr. 28, 2016

(65) Prior Publication Data
US 2017/0308347 A1    Oct. 26, 2017

(30) Foreign Application Priority Data

Oct. 24, 2014 (ES) .................. 201431388 U

(51) Int. Cl.
*G09G 3/32* (2016.01)
*G06F 3/14* (2006.01)
(Continued)

(52) U.S. Cl.
CPC .......... *G06F 3/1423* (2013.01); *G06F 1/1649* (2013.01); *G06F 3/14* (2013.01); *G09F 9/33* (2013.01); *G09G 3/32* (2013.01)

(58) Field of Classification Search
CPC ........ G06F 1/1649; G06F 3/1426; G09F 9/33; G09G 3/32
(Continued)

(56) References Cited

U.S. PATENT DOCUMENTS 6,498,721 B1 * 12/2002 Kim ........................ G06F 1/162
248/917
6,532,146 B1 * 3/2003 Duquette .............. G06F 1/1607
361/679.04
(Continued)

FOREIGN PATENT DOCUMENTS

WO    WO 2008/069969 A2    6/2008
WO    WO 2014111941 A1 *  7/2014 ............. F16M 11/08

OTHER PUBLICATIONS

International Search Report issued in PCT/ES2015/070773 dated Feb. 2, 2016.

*Primary Examiner* — Michael Pervan
(74) *Attorney, Agent, or Firm* — Arent Fox LLP

(57) ABSTRACT

The invention relates to an external LED panel that can be connected to an electronic user device designed to emit messages relating to the activity of said electronic user device in a passive and non-invasive form, comprising connection means compatible with an electronic device, an LED display, and at least one anchoring and supporting element designed to orient the display to a position that can be seen by third parties.

20 Claims, 4 Drawing Sheets

(51) Int. Cl.
*G09F 9/33* (2006.01)
*G06F 1/16* (2006.01)

(58) Field of Classification Search
USPC .............. 178/18.01–19.07; 345/1.1, 2.2–2.3, 345/173–178
See application file for complete search history.

(56) References Cited

U.S. PATENT DOCUMENTS

| | | | | |
|---|---|---|---|---|
| 7,283,353 | B1* | 10/2007 | Jordan | G06F 1/1601 |
| | | | | 248/122.1 |
| 9,441,782 | B2* | 9/2016 | Funk | F16M 13/02 |
| 9,529,464 | B2* | 12/2016 | Sitbon | F16M 11/08 |
| 2001/0054986 | A1* | 12/2001 | Leman | G06F 1/1616 |
| | | | | 345/1.1 |
| 2002/0109662 | A1* | 8/2002 | Miller | G06F 1/1616 |
| | | | | 345/100 |
| 2003/0095373 | A1* | 5/2003 | Duquette | G06F 1/1607 |
| | | | | 361/679.04 |
| 2004/0196209 | A1* | 10/2004 | Chen | G06F 1/1601 |
| | | | | 345/1.1 |
| 2005/0253775 | A1* | 11/2005 | Stewart | G06F 1/1616 |
| | | | | 345/1.1 |
| 2009/0201222 | A1* | 8/2009 | Damian | G06F 1/1601 |
| | | | | 345/1.1 |
| 2011/0154700 | A1 | 6/2011 | Ioakimidis | |
| 2011/0230178 | A1 | 9/2011 | Jones et al. | |
| 2015/0268699 | A1* | 9/2015 | Bathiche | G06F 1/1649 |
| | | | | 345/1.3 |

* cited by examiner

EXTENDED LED PANEL, MOBILE DEVICE AND METHOD FOR INTERACTION AND COMMUNICATION VIA AN EXTERNAL LED PANEL

CROSS-REFERENCE TO RELATED APPLICATIONS

This application is a National Stage entry of International Application No. PCT/ES2015/070773, filed Oct. 26, 2015, which claims priority to Spanish Patent Application No. U201431388, filed Oct. 24, 2014. The disclosure of the priority applications are hereby incorporated in their entirety by reference.

DESCRIPTION

The object of the present invention is an external LED panel that can be connected to an electronic user device, i.e., a portable or desktop computer, a tablet or a mobile telephone, providing additional information to third parties about the use being made of said electronic device of third parties or the actual state of the person. In the present invention, "external" is understood as any LED panel that is neither comprised nor integrated in the actual screen of the mobile telephone, computer or tablet.

PRIOR ART

When a user uses any electronic device today, such as a computer (portable or desktop), a tablet or a Smartphone, for example, said user has no way to interact with third parties other than using the actual means of said device, such as wireless connectivity, Bluetooth® or other equivalents, for example.

Likewise, it is impossible for a third party to known in that very instant what the user of the electronic device is doing, which may give rise to interruptions, nuisances and wastes of time for the user of the mentioned device.

Therefore, it would be recommendable to have an inexpensive product that allows the user to interact with third parties through his or her device in a passive and non-invasive form.

DESCRIPTION OF THE INVENTION

The object of the present invention is an external LED panel that can be connected to an electronic user device and that in turn comprises an LED display and connection means for being connected to the mentioned device, such as a serial port or a Bluetooth® or WIFI type wireless emitter-receiver, such that messages relating to the activity being conducted by the user of said device can be shown on the display forming the panel, notifying a third party as to which task the user is performing and whether or not it can be interrupted, all according to the claims attached to the present specification and incorporated in the present description by reference to same.

An advantage of the invention is the result of the foregoing and it relates to the use thereof in the business world, where work is often interrupted in order to perform certain preventable consultations with the panel object of the invention.

Another advantage of the invention results from the use thereof in an academic or school setting, where a third party, for example a professor, could control the use students make of computer equipment.

Finally, in the social setting, another substantial practical advantage of the panel in the use thereof is derived from the possibility of emitting messages for interacting with third parties in a passive form, i.e., in an autonomous form without the help of the user of the device, and in a non-invasive form, i.e. without interfering in devices of third parties, unlike messages in social media or instant messaging programs.

Throughout the description and claims the word "comprises" and variants thereof do not seek to exclude other technical features, additions, components or steps. For those skilled in the art, other objects, advantages and features of the invention will be inferred in part from the description and in part from putting the invention into practice. The following embodiments and drawings are provided by way of illustration and are not intended to restrict the present invention. Furthermore, the present invention covers all the possible combinations of particular and preferred embodiments herein indicated.

BRIEF DESCRIPTION OF THE DRAWINGS

A series of drawings which help to better understand the invention and expressly referring to an embodiment of said invention provided as a non-limiting example thereof is very briefly described below.

DETAILED DESCRIPTION OF AN EMBODIMENT OF THE INVENTION

As can be seen in the attached drawings, the external LED panel (10) is designed as an element that can be connected to an electronic user device (100) designed to emit messages relating to the activity of said electronic user device (100) in a passive and non-invasive form, through either a wired connection (11a) or through a wireless connection (11b).

In the present description, the expressions electronic user device, portable electronic device or user device are treated as synonyms and generally refer to any user device susceptible to being connected or incorporating the external LED panel (10) as described below.

Figure 1:
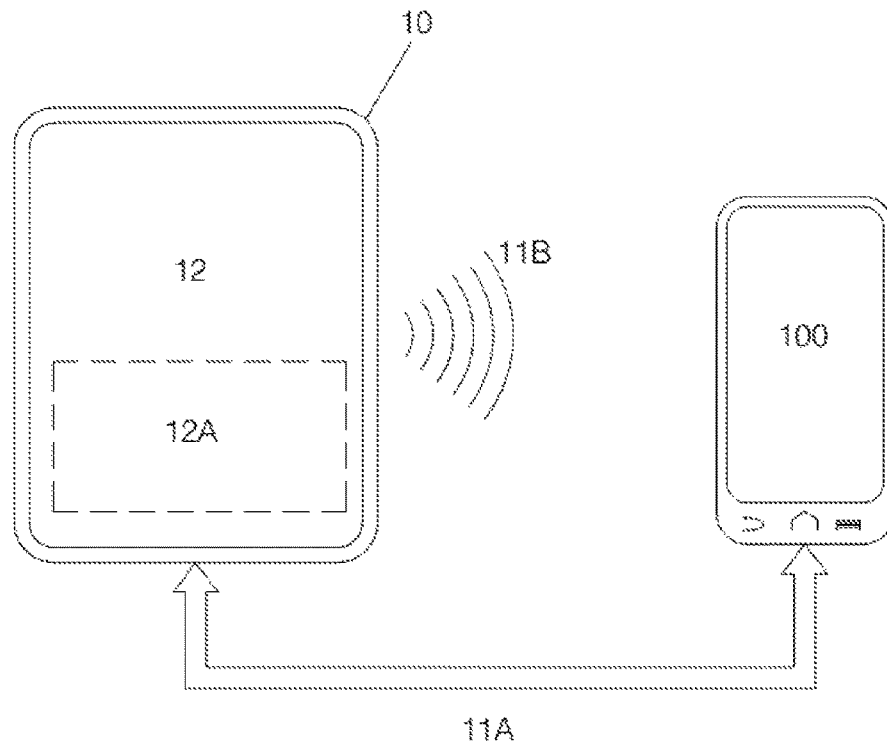
FIG. 1 shows a schematic view of the external LED panel object of the invention.

The external LED panel (10) comprises an LED display (12) comprising a touch region (12a) in a non-limiting practical embodiment as shown in FIG. 1.

Figure 2:
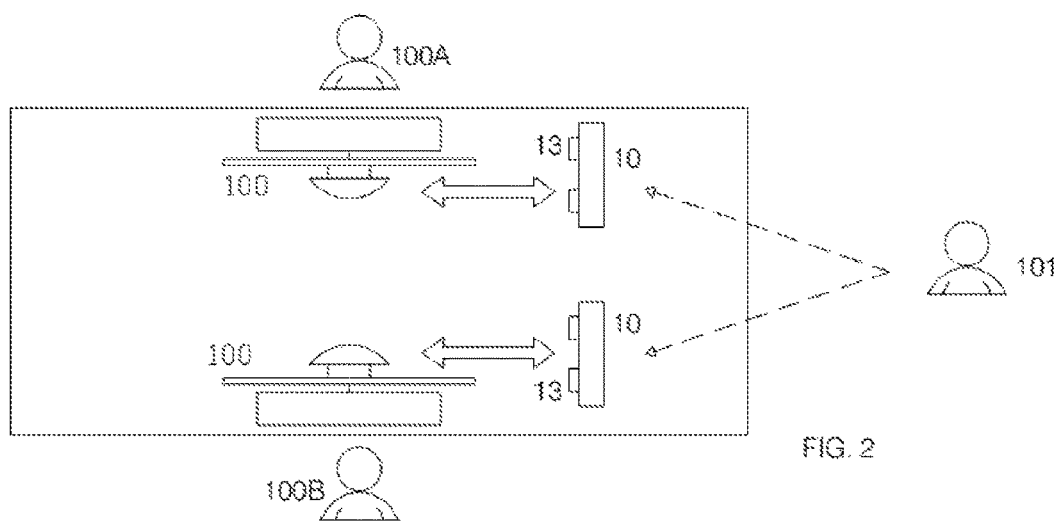
FIG. 2 shows a schematic view of the LED panel in business applications.

The external LED panel (10) is completed with anchoring and supporting elements (13) designed to locate said panel in a position that can be seen by third parties (101, 102, 103). More specifically, the typical office design can be seen in FIG. 2, with desks and users (100a, 100b) facing one another. In this case, the external LED panels (10) are connected to the respective computers (100) of the users (100a, 100b) and the anchoring and supporting elements (13) are, for example, pedestals orienting the panel (10) to the area where a third party (101) is able to view them and thus read the messages that may be emitted by the panels (10) relating to the work done by the users (100a, 100b).

Figure 3:
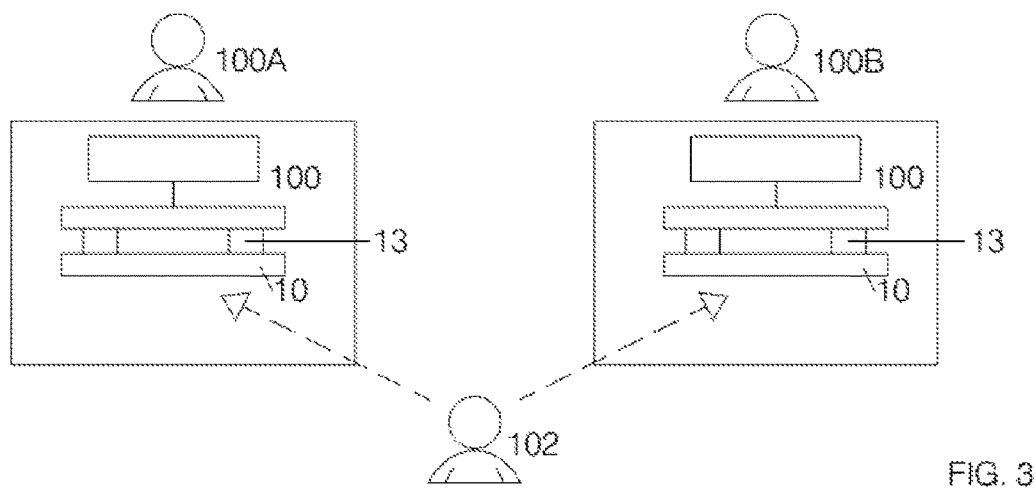
FIG. 3 shows a schematic view of the LED panel in school applications.

On the other hand, FIG. 3 shows an academic classroom design with the desks and users (100a, 100b) parallel to one another, with a third party (102) facing them. In this case, the external LED panels (10) are connected to the respective computers (100) of the users (100a, 100b) and the anchoring and supporting elements (13) are, for example, tabs fixing the panel (10) in the rear part of the devices (100) in the area where a third party (102) is capable of seeing them.

Figure 4:
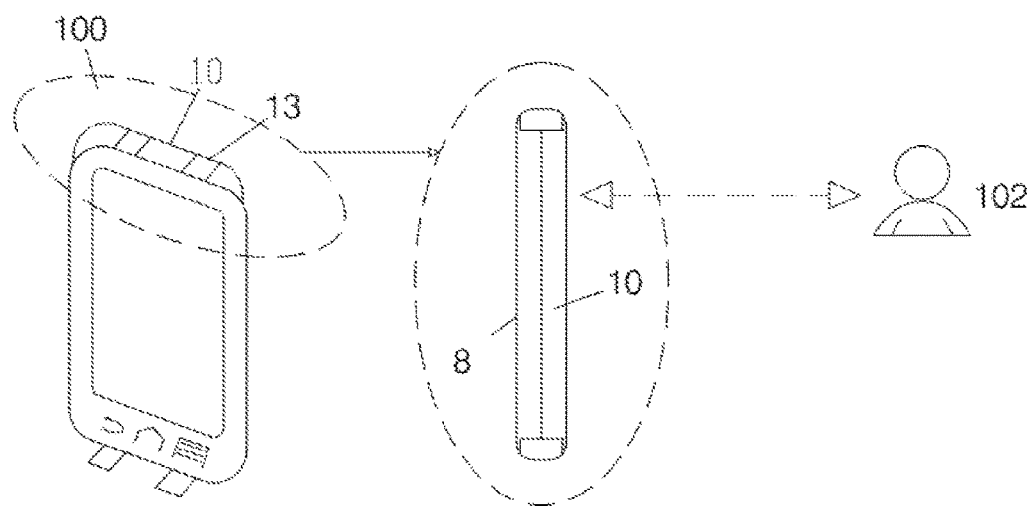
FIG. 4 shows a schematized view of the LED panel in social applications.

Finally, FIG. 4 shows the use of the panel (10) in a user device (100), in this case a mobile telephone, where the external LED panel (10) is fixed to the rear part thereof by means of tab-type anchoring and supporting elements (13), the external LED panel (10) acting like a back case, where a third party (103) can see the messages emitted by said panel (10).

Figure 5:
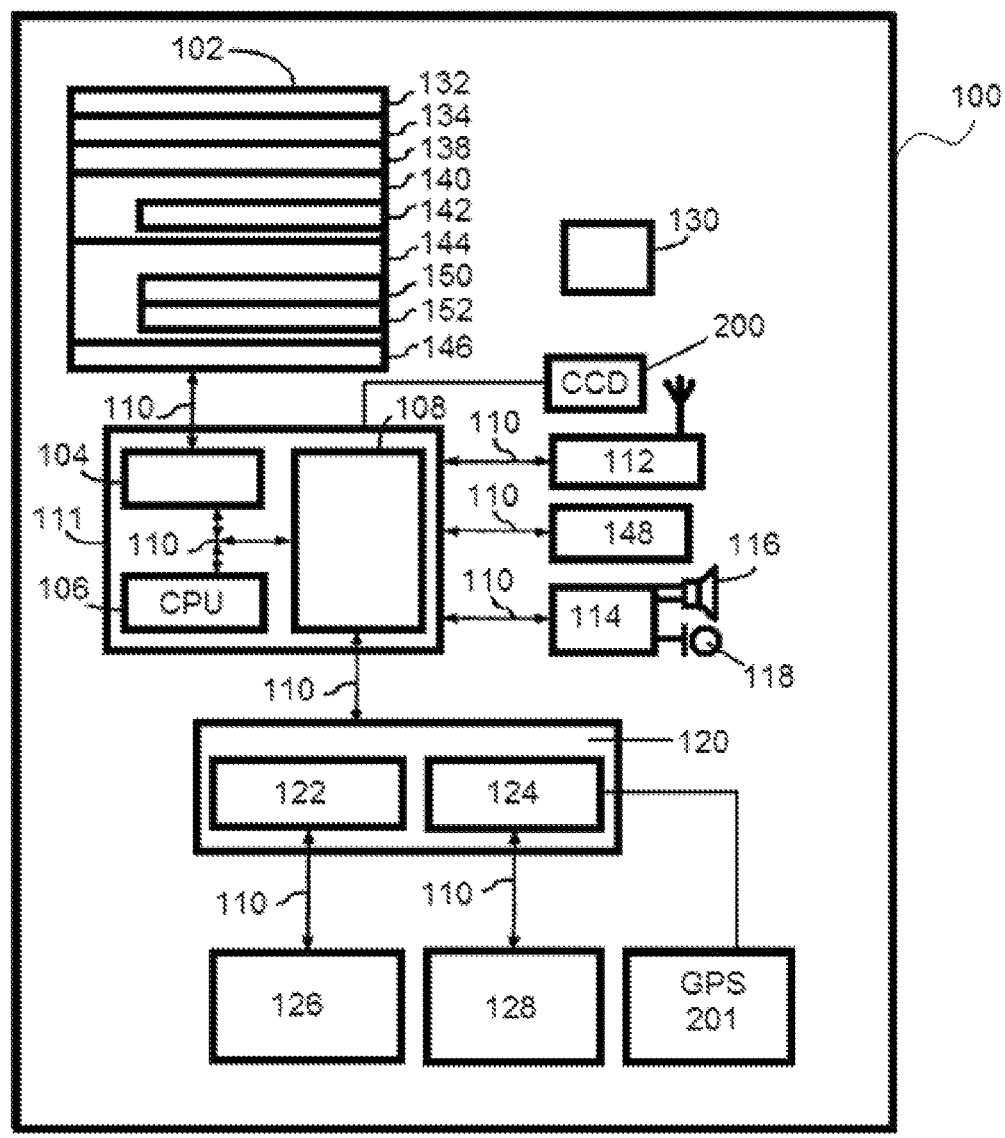
FIG. 5 shows a scheme of a portable electronic device like the one of a practical embodiment of the present invention.

More specifically, the mobile user device (100) according to a particular embodiment of the present invention The portable electronic device 100 can be any device selected from computers, tablets and mobile telephones, although an architecture preferred for a mobile device is shown in FIG. 5. Generally, any programmable communication device can be designed as a device for the present invention.

FIG. 5 illustrates a portable electronic device according to some embodiments of the invention. The portable electronic device 100 of the invention includes a memory 102, a memory controller 104, one or more processing units 106 (CPU), a peripheral interface 108, a RF circuit system 112, an audio circuit system 114, a loudspeaker 116, a microphone 118, an input/output (I/O) subsystem 120, a touch screen 126, other input or control devices 128 and an external port 148. These components communicate over one or more communication buses or signal lines 110. The device 100 can be any portable electronic device, including in a non-limiting sense a portable computer, a tablet, a mobile telephone, a multimedia player, a personal digital assistant (PDA), or the like, including a combination of two or more of these items. It should be noted that the device 100 is only one example of a portable electronic device 100 and that the device 100 can have more or less components than those shown or a different component design. The different components shown in FIG. 1 can be implemented in hardware, software or in a combination of both, including one or more application-specific integrated circuits and/or signal processing circuits. Likewise, the screen 126 has been defined as a touch screen, although the invention can also be implemented in devices with a standard screen.

The memory 102 can include a high-speed random access memory and can also include a non-volatile memory, such as one or more magnetic disc storage devices, flash memory devices or other non-volatile solid-state memory devices. In some embodiments, the memory 102 can furthermore include a storage located remotely with respect to the one or more processors 106, for example a storage connected to a network which is accessed via the RF circuit system 112 or the external port 148 and a communications network (not shown) such as Internet, intranet(s), local area networks (LAN), wide local area networks (WLAN), storage area networks (SAN) and others, or any suitable combinations thereof. Access to the memory 102 by other components of the device 100, such as the CPU 106 and the peripheral interface 108, can be controlled by means of the memory controller 104.

The peripheral interface 108 connects the input and output peripherals of the device to the CPU 106 and to the memory 102. One or more processors 106 execute different software programs and/or instruction sets stored in the memory 102 for performing different functions of the device 100 and for data processing.

In some embodiments, the peripheral interface 108, the CPU 106 and the memory controller 104 can be implemented in a single chip, such as chip 111. In other embodiments, it can be implemented in several chips.

The RF (radio frequency) circuit system 112 receives and sends electromagnetic waves. The RF circuit system 112 converts electric signals into electromagnetic waves, and vice versa, and communicates with the communications networks and other communication devices via the electromagnetic waves. The RF circuit system 112 can include a widely known circuit system to perform these functions, including in a non-limiting sense an antenna system, an RF transceiver, one or more amplifiers, a tuner, one or more oscillators, a digital signal processor, a CODEC chipset, a Subscriber Identity Module (SIM) card, a memory, etc. The RF circuit system 112 can communicate with networks, such as Internet, also referred to as World Wide Web (WWW), an Intranet and/or a wireless network, such as a cellular telephone network, a wireless Local Area Network (LAN) and/or a Metropolitan Area Network (MAN) and with other devices by means of wireless communication. The wireless communication can use any of a plurality of communications standards, protocols and technologies, including in a non-limiting sense the Global System for Mobile Communications (GSM), the Enhanced Data Rate for GSM Evolution (EDGE), Wideband Code Division Multiple Access (W-CDMA), Code Division Multiple Access (CDMA), Time Division Multiple Access (TDMA), Bluetooth, wireless access (Wi-Fi) (for example, IEEE 802.11a, IEEE 802.11b, IEEE 802.11g and/or IEEE 802.11n), Voice over IP (VoIP) protocol, Wi-MAX, an electronic mail protocol, instant messaging and/or Short Message Service (SMS) or any other suitable communication protocol, including communication protocols that have not yet been developed as of the date of filing of this document.

The audio circuit system 114, the loudspeaker 116 and the microphone 118 provide an audio interface between a user and the device 100. The audio circuit system 114 receives audio data from the peripheral interface 108, converts the audio data into an electric signal and transmits the electric signal to the loudspeaker 116. The loudspeaker converts the electric signal into sound waves audible for humans. The audio circuit system 114 also receives electric signals converted by the microphone 116 from sound waves. The audio circuit system 114 converts the electric signal into audio data and transmits the audio data to the peripheral interface 108 for processing. The audio data can be recovered and/or transmitted to the memory 102 and/or to the RF circuit system 112 by means of the peripheral interface 108. In some embodiments, the audio circuit system 114 also includes an earphone connection (not shown). The earphone connection provides an interface between the audio circuit system 114 and detachable input/output audio peripherals, such as earphones only for output or an earphone for both output (earphones for one or both ears) and input (microphone).

The I/O subsystem 120 provides the interface between the input/output peripherals of the device 100, such as the touch screen 126 and other input/control devices 128, and the peripheral interface 108. The I/O subsystem 120 includes a touch screen controller 122 and one or more input controllers 124 for other input or control devices. The input controllers or controller 124 receive(s)/send(s) electric signals from/to other input or control devices 128. The other input/control devices 128 can include physical buttons (for example push buttons, toggle buttons, etc.), dials, slide switches, and/or geographic location means 201, such as GPS or equivalents.

The touch screen 126 in this practical embodiment provides both an output interface and an input interface between the device and a user. The touch screen controller 122 receives/sends electric signals from/to the touch screen 126. The touch screen 126 shows the visual output to the user. The visual output can include text, graphics, video and any combinations thereof. Some or all of the visual output may correspond with user interface objects, the additional details of which are described below.

The touch screen 126 also accepts user inputs based on haptic or tactile contact. The touch screen 126 forms a contact-sensitive surface that accepts user inputs. The touch screen 126 and the touch screen controller 122 (together with any of the associated modules and/or instruction sets of the memory 102) detects the contact (and any movement or loss of contact) on the touch screen 126 and converts the detected contact into interaction with user interface objects, such as one or more programmable keys shown on the touch screen. In an exemplary embodiment, a point of contact between the touch screen 126 and the user corresponds with one or more of the user's fingers. The touch screen 126 can use LCD (Liquid Crystal Display) technology or LPD (Light-emitting Polymer Display) technology, although other display technologies can be used in other embodiments. The touch screen 126 and the touch screen controller 122 can detect contact and any movement or lack thereof using any of a plurality of contact sensitivity technologies, including in a non-limiting sense capacitive, resistive, infrared and surface acoustic wave technologies, as well as other proximity sensor arrays or other elements to determine one or more points of contact with the touch screen 126.

The device 100 also includes a power supply system 130 for powering the different components. The power supply system 130 can include an energy management system, one or more power sources (for example batteries, alternating current (AC)), a rechargeable system, a power failure detection circuit, a power converter or inverter, a power state indicator (for example, a light-emitting diode (LED)) and any other component associated with power generation, management and distribution in portable devices.

In some embodiments, the software components include an operating system 132, a communication module 134 (or instruction set), a contact/movement module 138 (or instruction set), a graphics module 140 (or instruction set), a user interface state module 144 (or instruction set) and one or more applications 146 (or instruction set).

The operating system 132 (for example, Darwin, RTXC, LINUX, UNIX, OS X, WINDOWS, or an embedded operating system), includes different software components and/or controllers for controlling and managing general system tasks (for example, memory management, storage device control, power management, etc.) and makes communication between the different hardware and software components easier.

The communication module 134 makes communication with other devices via one or more external ports 148 easier and also includes different software components for managing the data received by the RF circuit system 112 and/or the external port 148. The external port 148 (for example, a universal serial bus (USB), FIREWIRE, etc.) is suitable for being connected directly to other devices or indirectly via a network (for example, Internet, wireless LAN, etc.).

The contact/movement module 138 detects contact with the touch screen 126, together with the touch screen controller 122. The contact/movement module 138 includes different software components to perform different operations relating to detecting contact with the touch screen 126, such as determining if contact has taken place, determining if there is contact movement and tracking the movement through the touch screen, and determining if contact has been interrupted (i.e., if contact has stopped). Determining movement of the point of contact can include determining the speed (magnitude), velocity (magnitude and direction) and/or the acceleration (including magnitude and/or direction) of the point of contact. In some embodiments, the contact/movement module 126 and the touch screen controller 122 also detect contact on the touch pad.

The graphics module 140 includes different software components known for showing and displaying graphics on the touch screen 126. It must be noted that the term "graphics" includes any object that can be shown to a user, including in a non-limiting sense text, Web pages, icons (such as user interface objects including programmable keys), digital images, videos, animations and the like.

In some embodiments, the graphics module 140 includes an optical intensity module 142. The optical intensity module 142 controls the optical intensity of graphic objects, such as user interface objects, shown on the touch screen 126. Optical intensity control can include the increase or decrease in optical intensity of a graphic object. In some embodiments, the increase or decrease may obey predetermined functions.

The user interface state module 144 controls the state of the user interface of the device 100. The user interface state module 144 can include a locking module 150 and a release module 152. The locking module detects the situation of meeting any of one or more conditions for transitioning the device 100 to a user interface locked state and for transitioning the device 100 to the locked state. The release module detects the situation of meeting any of one or more conditions for transitioning the device to a user interface released state and for transitioning the device 100 to the released state.

The application or applications 130 may include any application installed in the device 100, including in a non-limiting sense a browser, an address book, a contact list, electronic mail, instant messaging, text processing, keyboard emulations, graphic objects, JAVA applications, encryption, digital rights management, voice recognition, voice replication, the capacity to determine position (such as that provided by a Global Positioning System (GPS)), a music player (which plays recorded music stored in one or more files, such as MP3 or AAC files), etc.

In some embodiments, the device 100 can include one or more optional optical sensors (not shown), such as CMOS or CCD 200 image sensors, for use in imaging applications.

Nevertheless, the indicated hardware structure is one of a number that are possible and it must be taken into account that the device 100 can include other image capture elements such as a camera, scanner, laser tracer or the combination of any of these types of devices, which can provide the mobile device with a representation of the real-life environment in video format, image sequence, vector format or any type of combination of the mentioned formats.

Likewise, the device 100 can include geographic location devices based on GPS positioning satellite networks, devices to assist in finding geographic location based on GPS satellite networks and the IP location of internet networks -AGPS-, geographic location devices based on triangulating radio signals provided by WIFI antennas and Bluetooth® devices (ISSP), the combination of any of these mentioned devices or any type of device that allows providing the mobile device with numerical data about its geographic location.

The device 100 can include any type of element capable of representing images in real time with at least 24 FPS (frames per second), such as TFT displays, TFT-LED displays, TFT-OLED displays, TFT-Retina displays, the combination of any of the foregoing, in addition to Holo-TFT new generation displays, see-through displays and microprojectors or any graphic representation device that can provide the mobile device 100 with a way to represent visual content to the user.

The device 100 includes a processor or set of processors which, either by themselves or combined with graphics processors such as a GPU (Graphics Processing Unit) or APU (Accelerated Processing Unit), can provide the mobile device 100 with the capacity to represent vector graphics in real execution time and form texturized polygons with them, via vector representation libraries (sets of standard graphic representation procedures for different platforms) such as OpenGL, DirectX or libraries of any type intended for this purpose.

Figure 6:
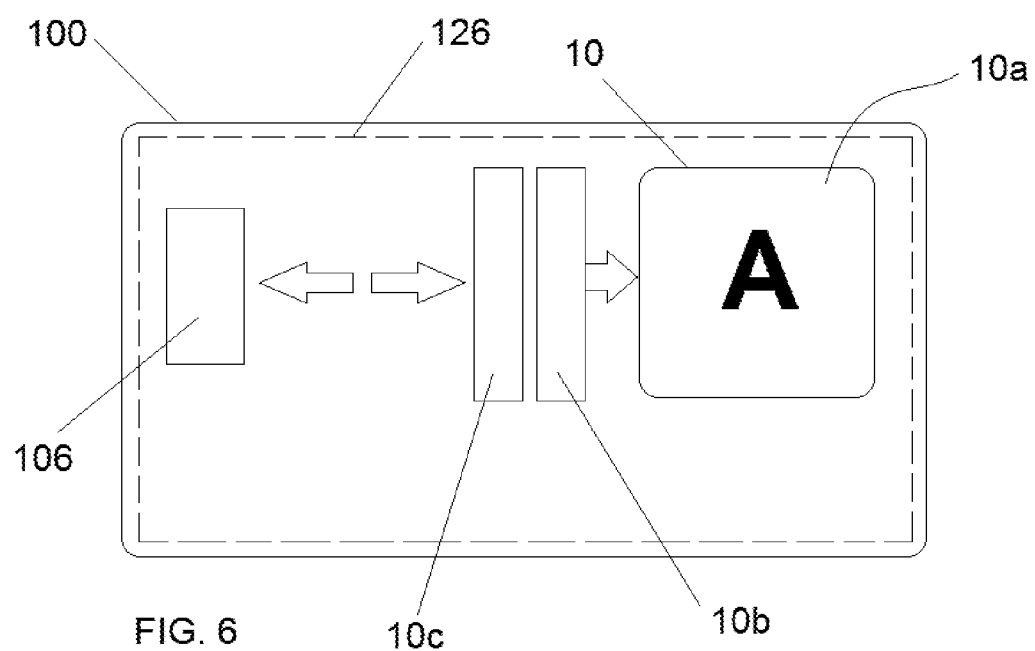
FIG. 6 shows a scheme of a circuit diagram with respect to an electronic device.

FIG. 6 shows a second example of an external LED panel (10) comprising an LED array (10*a*) the connection of which to the portable electronic device (100) is performed by means of a driver circuit (10*b*) of the LED array and an interface circuit (10*c*). All the components in this embodiment were naturally of the Ultra Slim type in order to reduce total display thickness. In this embodiment, the external LED panel (10) is integrated in the casing of the device (100) showing a message (A) in the LED array (10*a*) forming the panel. Integration in the casing can be done during the process of manufacturing the actual device (100) or during the process of manufacturing the actual casing, before the final assembly thereof.

The present invention can be used in different modes. There is an education mode, a professional mode, a social mode and a game mode. Said modes essentially indicate the different capacities and areas of use of the invention, such as classrooms, businesses, social interaction and purely game-related.

In one example of the invention, the external LED panel (10) is used in a portable electronic device (100), such as a mobile telephone, tablet, phablet or laptop-type portable computer. In general, in said devices the LED display will be located in the rear part of same, and naturally on the outside, in contrast with the screen 126 of the electronic device 100 itself. Also in a non-limiting manner, the external LED panel can be used in portable electronic devices (100) used as glasses, such as for example multimedia glasses or 3D vision glasses or any other device with any other technology that makes the external LED panel (10) visible only from the outer front part of the glasses themselves, whereas the user thereof would only see his or her own screen 126. Other positions and uses of the external LED panel (10) in electronic devices with or without their own screen 126 which require an additional screen for interacting with other users, as well as other practical embodiments of the invention which, as is evident for a person skilled in the art, are likewise covered by the present invention.

Therefore, in a non-limiting manner the invention has different practical uses, such as the control by a third party of the use of computer systems and/or services in communications networks, for example. In a non-limiting manner, for example, it is possible for the external LED panel (10) to emit a message warning about an inappropriate use of social media access resources, such as indicating to a professor in a classroom, for example, that one of the students is chatting during the class.

Another non-limiting example of use is the possibility of sending messages that are coordinated between different external LED displays (10).

It has been described in the different embodiments that the external LED panel (10) is external in that it is not inserted or comprised in the actual screen 126 of the portable electronic device (100). Nevertheless, it is obvious for the person skilled in the art that the external LED panel (10) can be in its own frame or casing or else be integrated in the actual casing of the portable electronic device (100).

In a particular embodiment, the external LED panel (10) comprises means for correcting the angle of vision automatically.

In a particular embodiment, the external LED panel (10) allows visual intercommunication between different portable electronic devices (100) by means of encrypted messages and sending files.

In a particular embodiment, the external LED panel (10) allows visually answering questions, which enables use thereof in voting systems.

In a particular embodiment, the external LED panel (10) is based on LED technology due to its simplicity and cost. Nevertheless, it is obvious for any person skilled in the art that said technology can be replaced with another equivalent technology for the applications described in the present specification.

In a particular embodiment, the external LED panel (10) comprises means for regulating luminous intensity depending on the environment. In a particular embodiment, the portable electronic device (100) regulates the luminous intensity of the external LED panel (10) depending on the ambient light. In a particular embodiment, the device (100) can check to determine if the external LED panel (10) is being used with children and reduce its luminous intensity accordingly so as to not jeopardize their visual health and/or limit the use thereof according to medical recommendations.

Likewise, in a particular embodiment the external LED panel (10) can show messages including content from files received, for example, via the portable electronic device (100). In the same way, the external LED panel (10) will include other programs (132 to 146) stored in the memory (102) of the portable electronic device (100) for emitting messages through the actual external LED display (10).

In a particular embodiment, the external LED panel (10) interacts with the different elements comprising the portable electronic device (100) such as the camera (200), or with a presence detector for activation and deactivation. Interaction with the camera (200) further allows establishing direct communication between the user and the external LED panel (10) such that through facial recognition performed by the portable electronic device (100), the external LED panel (10) emits a message or the like, depending on said recognition. More specifically, the device (100) could identify the person, for example with a user record including a picture such that if anyone is using someone else's password to get in, this will be seen instantly on the external LED panel (10). Furthermore this could allow including personal data, such as a telephone number or Skype® address.

In another particular embodiment, the invention is designed to notify about services in restaurants, bars and the like.

In a particular embodiment, the external LED panel (10) reports the fraudulent use of the portable electronic device (100). So if there are several unsuccessful attempts to access the portable electronic device (100) (i.e. the user name or password were not correctly entered a minimum number of times, usually three), the external LED display will automatically emit a warning message.

In a particular embodiment, the external LED panel (10) comprises a "no distraction" mode, which is conceived for meetings or classes in classrooms where the user of the display is in a given program or use such that the remaining programs or actual warnings of the portable electronic device (100) cannot be started up (i.e. the remaining applications are locked). In the same way, the use thereof is possible for a notice to request the right to speak in meetings or classes.

In a particular embodiment, the external LED panel (10) comprises the activation of the loudspeakers 116 at the same time as the external LED display (10) itself to perform animations or reinforce the emitted message. Likewise, in another particular embodiment interaction with the microphone 118 is possible, i.e., using it or detecting its use. Additionally, in another particular embodiment, the user can, through the microphone 118 and/or the camera 200 record a message that can be played in the external LED panel (10) at a later time or that can be played in another external LED panel (10) connected to another device (100).

In a particular embodiment, the portable electronic device (100) comprises a program or programs (132 to 146) which allow knowing the number of hours the user is active working on the actual device (100), emitting said information via the external LED panel (10), as well as the amount of time a user is involved in a face-to-face or virtual meeting (through conferencing or videoconferencing systems such as Skype®) measuring the time used by each user and the level of participation.

In a particular embodiment, the external LED panel (10) comprises emitting advertising messages. Additionally, the external LED panel (10) can reproduce advertising messages received or read by the user in his or her device (100), for example via a BIDI code.

In a particular embodiment, the electronic user device (100) detects the MAC (Media Access Control) address of other user devices (100) such that the mode of use can be switched (e.g. from professional to game mode) or send a greetings message to a device (100) with which it has previously interacted. In other words, in addition to communicating via the display, the present invention can scan the MAC addresses of nearby devices (100) and relate a device with its MAC address and also physically position it (by means of georeferencing with the GPS circuit 201 of the device (100)).

Finally, in a particular embodiment, the external LED panel (10) and the user device (100) are designed as an assistance system for the interaction of deaf people, mute people or those people with speech or movement difficulties.

In addition to the particular embodiments described in this document, any combination of the different embodiments described herein is apparent for a person skilled in the art, as is any other use that is made of it without altering the essential structure of the invention described in the claims.

The invention claimed is:

1. An apparatus for interaction and communication comprising:
    an external light emitting diode (LED) panel connected to an electronic user device designed to emit messages relating to activity of a user of the electronic user device,
    wherein the external LED panel comprises connection means compatible with the electronic user device, an LED display, and at least one anchoring and supporting element designed to orient the LED display towards a position visible by third parties,
    wherein the external LED panel allows visual intercommunication between different portable electronic devices by means of encrypted messages and sending files, and
    wherein the electronic user device comprises a screen, one or more processors, a memory, and one or more programs stored in the memory and arranged to be executed by one or more processors, the one or more programs including instructions to:
        emit, through the external LED panel, at least one visual message corresponding directly with activity of the user of the electronic user device; and
        send messages that are coordinated between different external LED displays.

2. The apparatus of claim 1, wherein the external LED panel further comprises a presence sensor for activation and deactivation.

3. The apparatus of claim 1, wherein the electronic user device further comprises a camera, and wherein the one or more programs further include instructions to:
    establish, through interaction with the camera, a direct communication between the user and the external LED panel such that, through a facial recognition performed by the electronic user device, the external LED panel emits a message depending on a recognition of the user of the electronic user device.

4. The apparatus of claim 1, wherein the one or more programs further include instructions to:
    determine the number of hours the user is actively working on the electronic user device; and
    emit information via the external LED panel.

5. The apparatus of claim 1, wherein the electronic user device further comprises a GPS circuit, and wherein the one or more programs further include instructions to:
    scan a MAC address of a nearby electronic user device;
    relate the nearby device with its MAC address; and
    position physically the nearby electronic user device by means of georeferencing with the GPS circuit.

6. The apparatus of claim 1, wherein the connection means of the external LED panel are wireless connection means.

7. The apparatus of claim 1, wherein the LED display of the external LED panel comprises at least one touch region.

8. The apparatus of claim 1, wherein the external LED panel further comprises a LED array.

9. The apparatus of claim 1, wherein the at least one anchoring and supporting element of the external LED panel is a casing of the electronic user device in such a way that the external LED panel is integrated in the casing in a position opposite that of the screen of the electronic user device.

10. The apparatus of claim 1, wherein the external LED panel further comprising:
    means for correcting an angle of vision automatically; and
    means for regulating luminous intensity,
    wherein the one or more programs further include instructions to:
        regulate the luminous intensity depending on one or more of ambient lighting or a determination of the external LED panel being used by children.

11. A method for interaction and communication via an external light emitting diode (LED) display which, being computer-implemented, comprises:
- providing an apparatus including the external LED panel connected to an electronic user device;
- emitting through the external LED panel at least one visual message corresponding directly with activity of a user of the electronic user device;
- sending messages that are coordinated between different external LED displays; and
- visually intercommunicating between different electronic user devices by means of encrypted messages and sending files.

12. The method of claim 11, further comprising:
- correcting automatically the angle of vision of the external LED panel.

13. The method of claim 11, further comprising:
- regulating luminous intensity depending on one or more of ambient lighting or a determination of the external LED panel being used by children.

14. The method of claim 11, further comprising:
- activating a loudspeaker of the electronic user device at a same time as the external LED display.

15. The method of claim 11, further comprising:
- recording, through interaction with a microphone of the electronic user device or a camera of the electronic user device, a message that can be played in the external LED panel at a later time or that can be played in another external LED panel connected to another electronic user device.

16. A non-transitory computer program product including instructions arranged to be executed by one or more processors, comprising instructions to:
- provide an apparatus including an external LED panel connected to an electronic user device;
- emit through the external LED panel at least one visual message corresponding directly with activity of a user of the electronic user device;
- send messages that are coordinated between different external LED displays; and
- visually intercommunicate between different electronic user devices by means of encrypted messages and sending files.

17. The non-transitory computer program product of claim 16, further comprising instructions to:
- correct automatically the angle of vision of the external LED panel.

18. The non-transitory computer program product of claim 16, further comprising instructions to:
- regulate luminous intensity depending on one or more of ambient lighting or a determination of the external LED panel being used by children.

19. The non-transitory computer program product of claim 16, further comprising instructions to:
- activate a loudspeaker of the electronic user device at a same time as the external LED display.

20. The non-transitory computer program product of claim 16, further comprising instructions to:
- record, through interaction with a microphone of the electronic user device or a camera of the electronic user device, a message that can be played in the external LED panel at a later time or that can be played in another external LED panel connected to another electronic user device.

* * * * *